US007997163B2

(12) United States Patent
Casas

(10) Patent No.: US 7,997,163 B2
(45) Date of Patent: Aug. 16, 2011

(54) ADJUSTABLE LOCKING WINDAGE AND ELEVATION KNOB

(75) Inventor: Juan Carlos Casas, Ft. Lauderdale, FL (US)

(73) Assignee: Gamo Outdoor USA, Inc., Ft. Lauderdale, FL (US)

( * ) Notice: Subject to any disclaimer, the term of this patent is extended or adjusted under 35 U.S.C. 154(b) by 0 days.

(21) Appl. No.: 11/151,032

(22) Filed: Jun. 13, 2005

(65) Prior Publication Data

US 2006/0278035 A1 Dec. 14, 2006

(51) Int. Cl.
*G05G 1/10* (2006.01)
*F41G 1/38* (2006.01)
*G02B 23/00* (2006.01)

(52) U.S. Cl. ............................. 74/553; 42/122; 359/424

(58) Field of Classification Search .................... 74/527, 74/526, 553; 42/122; 359/424, 426; 33/347
See application file for complete search history.

(56) References Cited

U.S. PATENT DOCUMENTS

| | | | | | |
|---|---|---|---|---|---|
| 3,990,155 | A * | 11/1976 | Akin et al. | ...................... | 42/122 |
| 4,038,757 | A * | 8/1977 | Hicks et al. | ...................... | 42/122 |
| 4,125,944 | A * | 11/1978 | Esposito et al. | ................ | 33/347 |
| 4,247,161 | A * | 1/1981 | Unertl, Jr. | ..................... | 359/424 |
| 4,643,542 | A * | 2/1987 | Gibson | ......................... | 359/424 |
| 5,363,559 | A * | 11/1994 | McCarty | .......................... | 42/122 |
| 6,005,711 | A * | 12/1999 | Mai et al. | ....................... | 359/424 |
| 6,519,890 | B1 * | 2/2003 | Otteman | ......................... | 42/122 |
| 6,643,970 | B2 | 11/2003 | Huber | | |
| 6,691,447 | B1 * | 2/2004 | Otteman | ......................... | 42/122 |
| 6,721,095 | B2 | 4/2004 | Huber | | |
| 6,772,550 | B1 | 8/2004 | Leatherwood | | |
| 7,415,791 | B2 * | 8/2008 | Williams et al. | ................ | 42/122 |
| 7,626,760 | B2 * | 12/2009 | Wu | .............................. | 359/426 |

OTHER PUBLICATIONS

The World Book Encyclopedia, 1988 Ed., p. 223.*
Webster's II New Riverside University Dictionary, 1994 Ed., p. 550.*

* cited by examiner

*Primary Examiner* — Vinh T. Luong
(74) *Attorney, Agent, or Firm* — King & Spalding L.L.P.

(57) ABSTRACT

A novel, adjustable locking windage and elevation knob assembly for the improved accuracy of scopes wherein an adjustment turn knob may be raised from its locked position to rotate freely for desired windage or elevation adjustments and thereafter be pushed back down into a locked position.

2 Claims, 4 Drawing Sheets

ADJUSTABLE LOCKING WINDAGE AND ELEVATION KNOB

FIELD OF THE INVENTION

This invention relates to the design and construction of a novel, adjustable locking windage and elevation knob assembly for the improved accuracy of scopes.

BACKGROUND OF THE INVENTION

Scopes, particularly those used for hunting, are well known in the prior art. Scopes are generally used to assist hunters in aiming at desired targets. However, because gravity and wind play a role in the trajectory of a bullet by causing the bullet to drop and/or drift to one side of the intended target, hunters have to make adjustments to the scope to account for these effects. Moreover, as the effect of gravity and wind drift on a bullet's trajectory will vary depending upon the distance to the target, multiple adjustments may be necessary at a shooting range or in the field to account for these variances.

To address the above and other related scope adjustment and performance issues, the prior art has developed to include various adjustment knob assemblies. Most commonly, the scope adjustments are implemented in one of two ways. One such way is accomplished by utilizing an adjustment knob assembly that is manually rotated to make the desired adjustments using a screwdriver or similar device. The adjustment knob is covered by a weather resistant dust cap that is usually screwed over the adjustment knob assembly. Problems with these types of assemblies include the time and inconvenience of having to remove the dust cap and the necessity of utilizing a small screwdriver or similar device to effectuate adjustments. During the time it takes to implement these steps, a hunting target may have moved or, in the case of timed shooting competitions, valuable shooting time has elapsed. The second most common way utilizes an adjustment knob assembly that may rotate freely thereby allowing the user to make adjustments quickly. This type of adjustment assembly is generally reserved for scopes used on competition firearms where the firearm is not used in the hunting field but is maintained in a hard case and removed to a shooting bench or platform for competition fire. However, the drawback to this adjustment assembly is that the assembly may be easily knocked out of position and is not designed for field use where a sturdy and weather resistant adjustment assembly is a necessity.

The use of a push pull knob assembly is disclosed in prior art U.S. Pat. No. 6,721,095, entitled "Combined Illuminated Reticle and Focus Knob," disclosing the use of a push pull turn knob to activate an LED located in the sidewall of a reticle by engaging and disengaging a battery in the turn knob. The turn knob is further used to focus the scope by rotation of the turn knob. While this invention allows hunters to make quick adjustments using a single knob, it does not contemplate a locking device that would keep the knob in either the pushed or pulled position, or from rotating and in fact, does not address the problem solved by the instant invention. The cited art knob may be knocked out of position easily; thus causing the illuminated reticle to turn off or the scope to become unfocused at an inopportune time, such as when attempting to shoot a target.

Clearly there is a need for an adjustable locking knob assembly that allows for quick and easy adjustment of a scope and further prevents the adjustment knob assembly from moving once the desired position is set.

SUMMARY OF THE INVENTION

The inventive structure presents a number of advantages over the prior art. First, the invention is simple to form. The adjustment knob assembly may be attached to a scope or other sighting mechanism and may be adapted to conventional adjustment mechanisms through integral or aftermarket manufacture. In the preferred embodiment, a rubber washer and/or any other weather resistant material and/or sealant is placed between the turret and the adjustment knob assembly creating a weather resistant seal to prevent environmental elements from causing damage to the interior of the scope.

In the preferred embodiment, a turn knob is placed over the adjustment knob assembly. Within the turn knob is a knurl knob and a lock down nut, or a similar locking mechanism. The knurl knob fits above the lock down nut. In the preferred embodiment, the knurl knob has a hollow groove in the side of the knurl knob, which is capable of receiving a pin. Once the turn knob is in place, a pin is inserted through the turn knob and into the hollow groove in the knurl knob, which allows the turn knob to pull and push the knurl knob without the two pieces disengaging. When the turn knob is pushed down, the turn knob engages the annular grooves on the lock down nut preventing the knurl knob and turn knob from rotating or making any undesired adjustments. When the turn knob is pulled up, the turn knob is disengaged from the lock down nut and the knurl knob and turn knob may rotate freely to make desired adjustments until pushed back down, locking the knurl knob and turn knob into position.

DETAILED DESCRIPTION OF THE INVENTION

Figure 1:
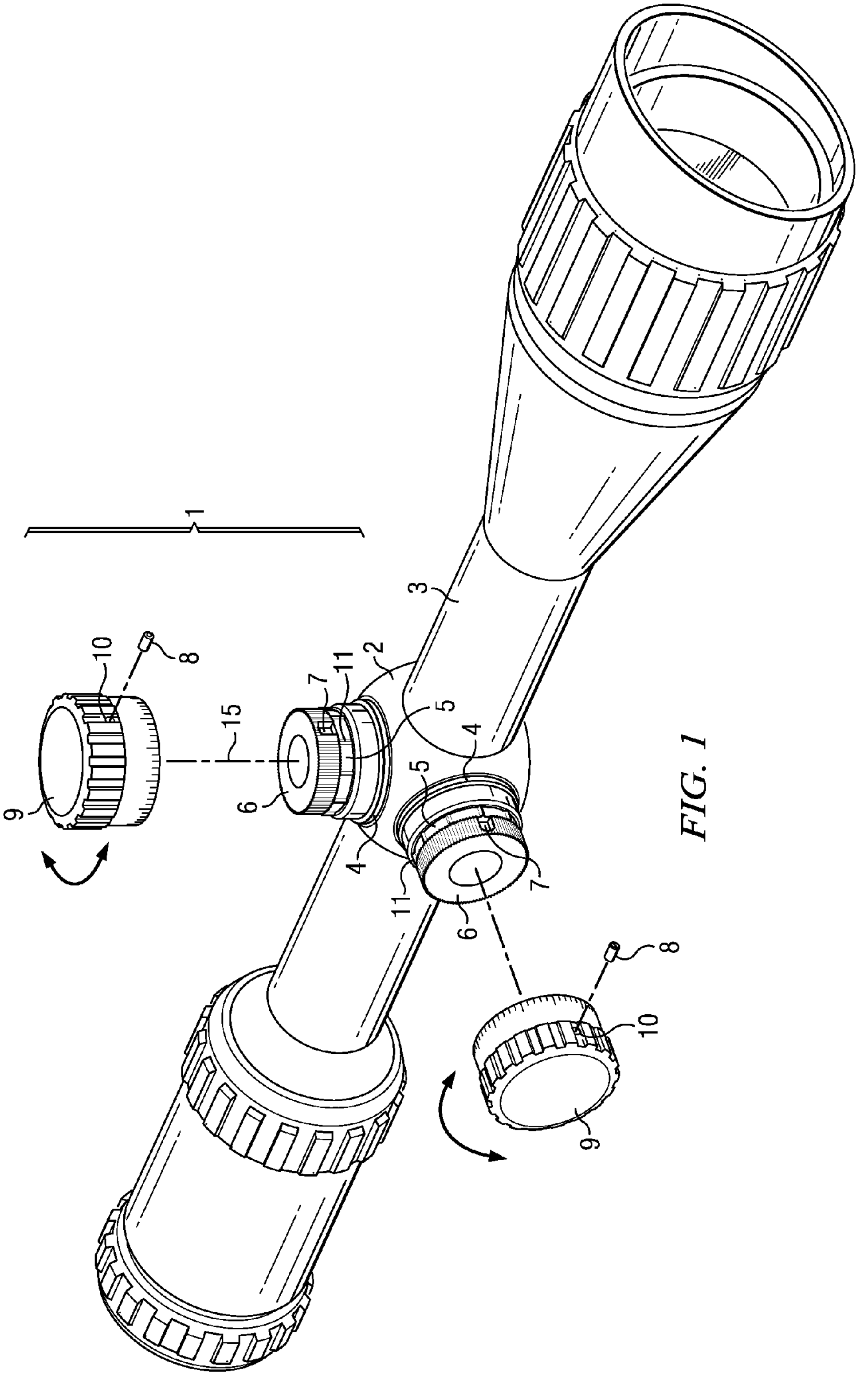
FIG. 1 is a view of the adjustment knob assembly according to the embodiments described herein.

Shown in FIG. 1 is an adjustment knob assembly 1 attached to a turret 2 of a scope 3. A rubber washer 4 is placed between the turret 2 and the adjustment knob assembly 1 to create a weatherproof seal between the turret 2 and the adjustment knob assembly 1. A knurl knob 6 is placed above the lock down nut 5. The knurl knob 6 has a hollow groove 7 on its side for receiving a pin 8. A turn knob 9 is placed over the knurl knob 6 and lock down nut 5 to form the adjustment knob assembly 1, as shown in FIG. 1, wherein the turn knob 9, the knurl knob 6, and the lock down nut 5 of adjustment knob assembly 1 are aligned along a longitudinal axis 15.

Once the turn knob 9 is placed over the knurl knob 6 and the lock down nut 5, a pin 8 is placed through hole 10 in turn knob 9. The hollow groove 7 on the side of the knurl knob 6 receives pin 8, which prevents the knurl knob 6 and turn knob 9 from disengaging during the push-pull movement.

Figure 3A:
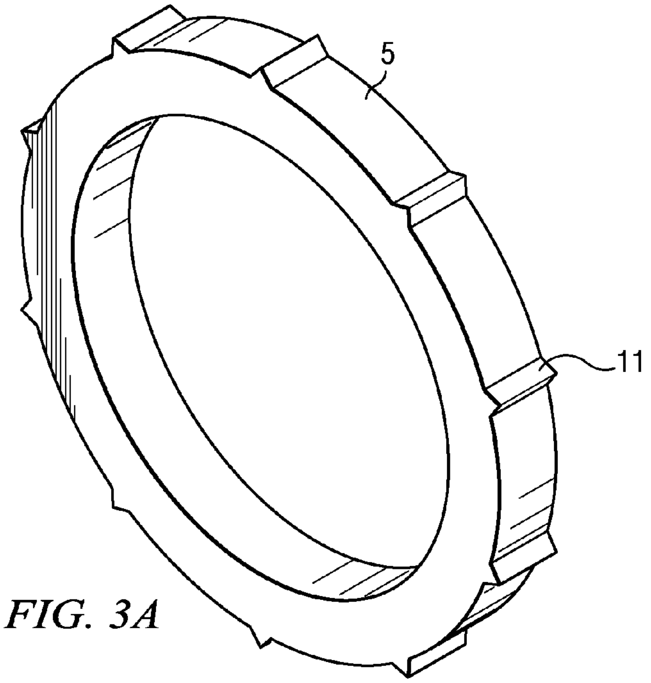
FIG. 3A is a perspective view of a lock down nut according to the embodiments described herein.
Figure 3B:
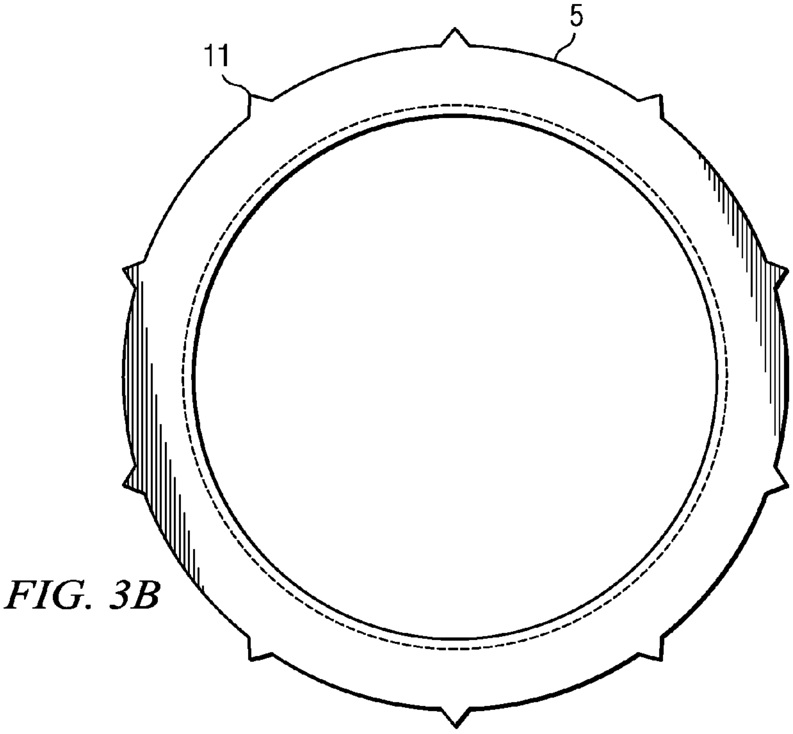
FIG. 3B is an end view of the lock down nut shown in FIG. 3A, according to the embodiments described herein.

When the turn knob 9 is pushed down over the lock down nut 5, ridges 11 on the lock down nut 5, as shown in FIG. 1, FIG. 3A, and FIG. 3B, prevent the turn knob 9 from moving forward or backward (i.e., rotating in either direction), thus locking the knurl knob 6 and turn knob 9 in place. When the turn knob 9 is pulled up, the turn knob 9 is disengaged from the lock down nut 5, and the turn knob 9 and knurl knob 6 may freely rotate to make the necessary adjustments for windage and elevation. Once the desired adjustment has been made, the user simply pushes the turn knob 9 down over the lock down nut 5 causing the turn knob 9 to engage the lock down nut 5 and prevent any further rotation of the adjustment knob assembly 1.

Figure 2A:
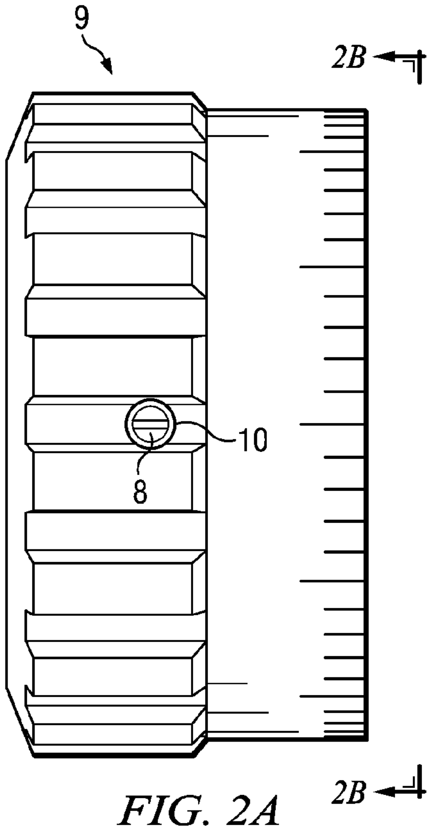
FIG. 2A is a side view of the turn knob according to the embodiments described herein.
Figure 2C:
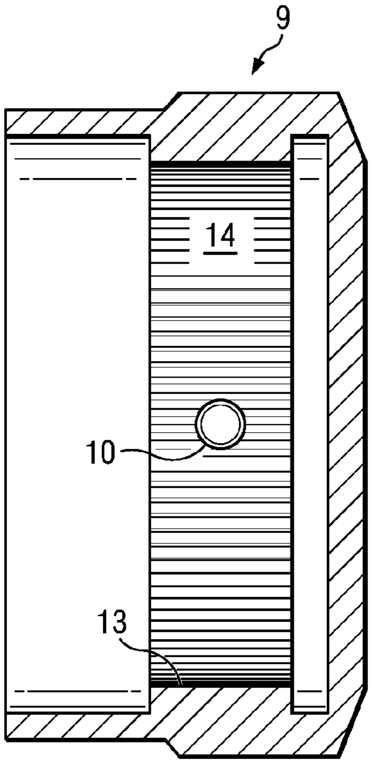
FIG. 2C is a cross-sectional view of the turn knob shown in FIG. 2A, as viewed from the plane 2C-2C in the direction of sight indicated by the arrows as shown in FIG. 2B, according to the embodiments described herein.
Figure 2B:
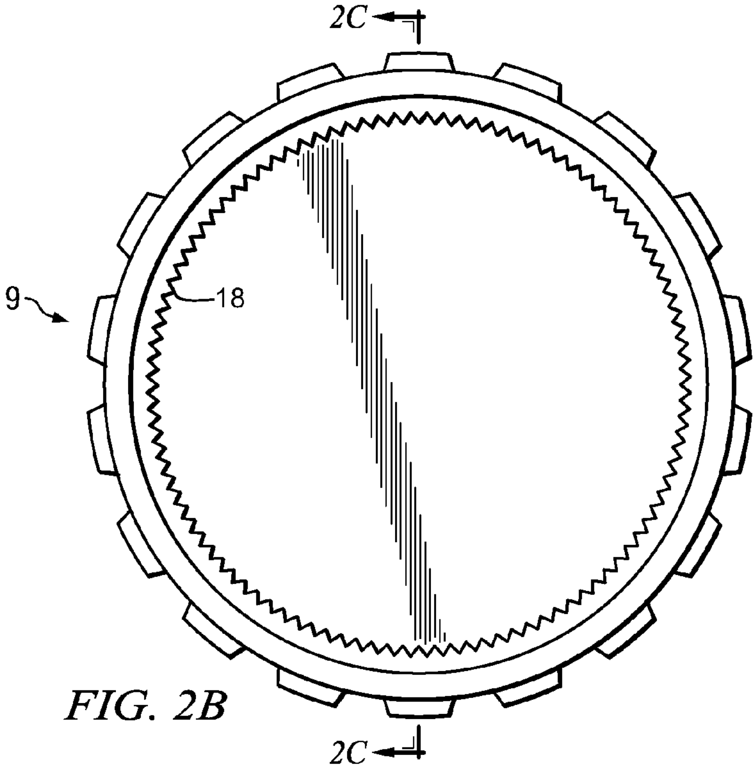
FIG. 2B is an end view of the turn knob shown in FIG. 2A, as viewed from the plane 2B-2B in the direction of sight indicated by the arrows as shown in FIG. 2A, according to the embodiments described herein.
Figure 4A:
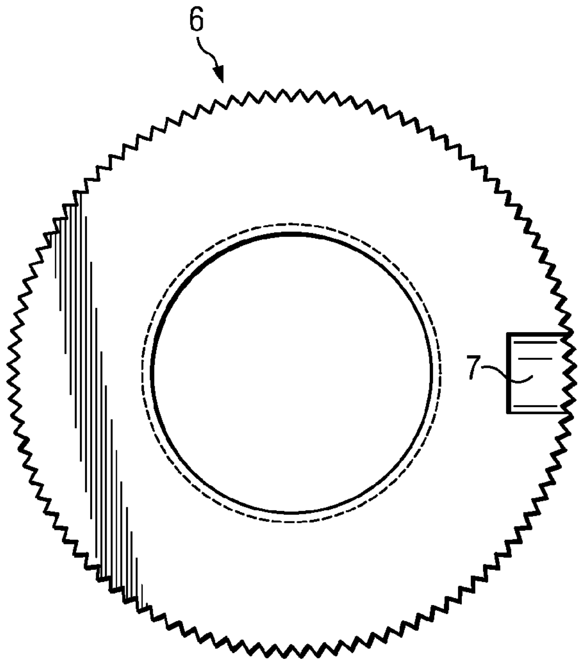
FIG. 4A is an end view of a knurl knob according to the embodiments described herein.
Figure 4B:
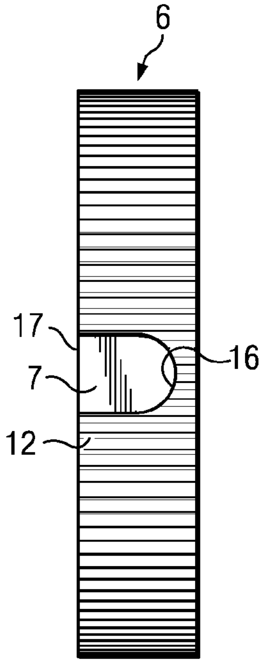
FIG. 4B is a side view of the knurl knob shown in FIG. 4A, according to the embodiments described herein.
Figure 4C:
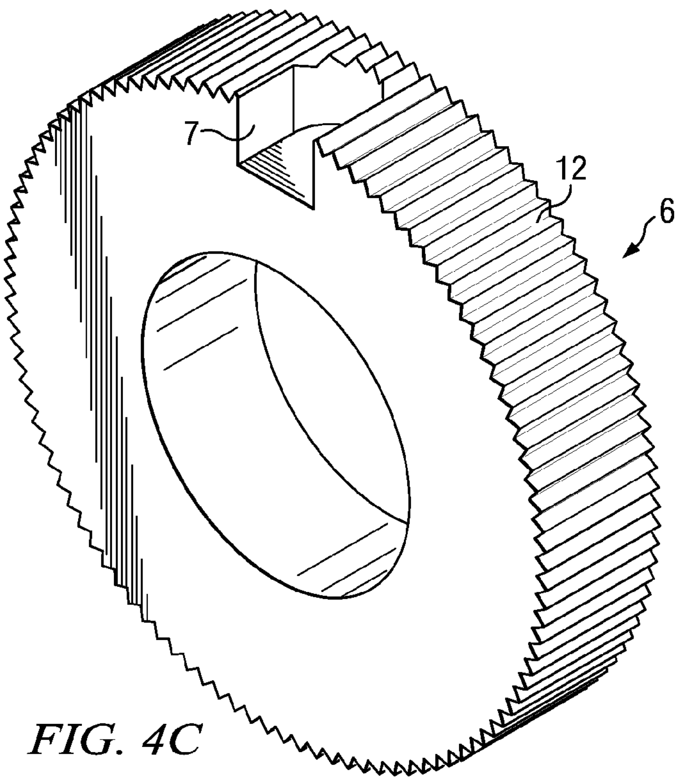
FIG. 4C is a perspective view of the knurl knob shown in FIG. 4A, according to the embodiments described herein.

As shown in FIG. 2C, turn knob 9 includes a sidewall 13 defining in part a central cavity 14 formed within turn knob 9, the central cavity 14 being adapted to receive the knurl knob 6. As shown in FIG. 1, FIG. 2A, and FIG. 2C, turn knob 9 includes a hole 10 in the side of the turn knob 9. Hole 10 and groove 7 receive the pin 8 after the turn knob 9 is placed over the knurl knob 6 and the lock down nut 5, in order to prevent the knurl knob 6 and turn knob 9 from disengaging during the push-pull movement. As shown in FIG. 4C, groove 7 extends from a first, closed end 16 to a second, open end 17. The turn knob 9, lock down nut 5, and knurl knob 6 form the adjustment knob assembly 1.

The lock down nut 5, as shown in FIG. 3A and FIG. 3B, has ridges 11 on the outside, which lock the knurl knob 6 and turn knob 9 in place to prevent the turn knob 9 from moving forward or backward (i.e., rotating in either direction) when the turn knob 9 is pushed down over the lock down nut 5.

As shown in FIG. 1, FIG. 2B, FIG. 2C, FIG. 4A, FIG. 4B, and FIG. 4C, the knurl knob 6 has side grooves 12 for mating with ridges 18 formed on the inside of the turn knob 9 and a hollow groove 7 for receiving the pin 8 placed through hole 10 in the side of turn knob 9 once turn knob 9 has been placed over knurl knob 6 and lock down nut 5 to prevent the knurl knob 6 and turn knob 9 from disengaging during the push-pull movement.

What is claimed is:

1. A knob assembly for a scope comprising:

a knurl knob, a lock down nut, and a turn knob aligned along a longitudinal axis, the knurl knob having a non-threaded outer surface including knurl knob grooves and an elongated groove receiving a pin, the elongated groove extending from a first end to a second end, the lock down nut disposed adjacent the knurl knob and having a non-threaded outer surface including lock down nut ridges, the turn knob including an inner sidewall defining in part a central cavity formed within the turn knob, the inner sidewall having a non-threaded surface including turn knob ridges having a shape and size for interlocking with both (a) the knurl knob grooves and (b) the lock down nut ridges, the central cavity adapted to receive the knurl knob and to permit movement of the turn knob relative to the knurl knob along the longitudinal axis;

the pin extending through a hole in the inner sidewall and into the elongated groove formed in the knurl knob, the pin having a size and shape relative to the elongated groove such that the pin is movable between the first and second ends of the groove;

in a first position of the knob assembly, the pin is located proximate the first end of the groove formed in the knurl knob, the knurl knob grooves are received within the central cavity of the turn knob and interlocked with the turn knob ridges, the lock down nut ridges are disposed outside the central cavity of the turn knob and not interlocked with the turn knob ridges, and the knurl knob and the turn knob are rotatable about the longitudinal axis relative to the lock down nut, and in a second position of the knob assembly, the pin is located proximate the second end of the groove formed in the knurl knob, the knurl knob grooves and the lock down nut ridges both are received within the central cavity of the turn knob and interlocked with the turn knob ridges, and the knurl knob and turn knob are not rotatable about the longitudinal axis relative to the lock down nut or relative to each other;

wherein the lock down nut ridges are configured for preventing rotational movement of the turn knob about the longitudinal axis relative to the lock down nut when the lock down nut is disposed within the central cavity of the turn knob.

2. A scope comprising:

a turret, an adjustment knob assembly, and a seal between the turret and the adjustment knob assembly, wherein the adjustment knob assembly includes:

a knurl knob, a lock down nut, and a turn knob aligned along a longitudinal axis, the knurl knob having a non-threaded outer surface including knurl knob grooves and an elongated groove receiving a pin, the elongated groove extending from a first end to a second end, the lock down nut disposed adjacent the knurl knob and having a non-threaded outer surface including lock down nut ridges, the turn knob including an inner sidewall defining in part a central cavity formed within the turn knob, the inner sidewall having a non-threaded surface including turn knob ridges having a shape and size for interlocking with both (a) the knurl knob grooves and (b) the lock down nut ridges, the central cavity adapted to receive the knurl knob and to permit movement of the turn knob relative to the knurl knob along the longitudinal axis;

the pin extending through a hole in the inner sidewall and into the elongated groove formed in the knurl knob, the pin having a size and shape relative to the elongated groove such that the pin is movable between the first and second ends of the groove;

in a first position of the knob assembly, the pin is located proximate the first end of the groove formed in the knurl knob, the knurl knob grooves are received within the central cavity of the turn knob and interlocked with the turn knob ridges, the lock down nut ridges are disposed outside the central cavity of the turn knob and not interlocked with the turn knob ridges, and the knurl knob and the turn knob are rotatable about the longitudinal axis relative to the lock down nut, and in a second position of the knob assembly, the pin is located proximate the second end of the groove formed in the knurl knob, the knurl knob grooves and the lock down nut ridges both are received with the central cavity of the turn knob and interlocked with the turn knob ridges, and the knurl knob and turn knob are not rotatable about the longitudinal axis relative to the lock down nut or relative to each other;

wherein the lock down nut ridges are configured for preventing rotational movement of the turn knob about the longitudinal axis relative to the lock down nut when the lock down nut is disposed within the central cavity of the turn knob. .

* * * * *